(12) United States Patent
Nakatsugawa et al.

(10) Patent No.: US 7,735,734 B2
(45) Date of Patent: Jun. 15, 2010

(54) PORTABLE TERMINAL UNIT

(75) Inventors: Hiroyuki Nakatsugawa, Kawasaki (JP); Kazuhiro Hosaka, Kawasaki (JP); Takuya Otsuki, Kawasaki (JP); Masashi Sanjo, Kawasaki (JP); Toshinao Osaka, Kawasaki (JP); Hiroko Saito, Kawasaki (JP); Yoshiteru Chiba, Kawasaki (JP); Kenetsu Furuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 11/589,184

(22) Filed: Oct. 30, 2006

(65) Prior Publication Data
US 2007/0272752 A1 Nov. 29, 2007

(30) Foreign Application Priority Data
May 29, 2006 (JP) ............................. 2006-148103

(51) Int. Cl.
G06K 7/08 (2006.01)
H04M 1/66 (2006.01)
G06F 17/00 (2006.01)

(52) U.S. Cl. ........................ 235/451; 455/411; 455/558; 235/375

(58) Field of Classification Search ................. 711/152; 380/270; 235/375, 451, 439; 455/422.1, 455/411; 726/2
See application file for complete search history.

(56) References Cited

U.S. PATENT DOCUMENTS 5,992,738 A 11/1999 Matsumoto et al.
6,266,653 B1 7/2001 Shiobara et al.
6,634,549 B1 10/2003 Matsumoto et al.
2003/0174839 A1 9/2003 Yamagata et al.
2005/0258229 A1* 11/2005 Minemura ................... 235/375
2006/0095688 A1* 5/2006 Kawamura et al. .......... 711/152
2007/0250906 A1* 10/2007 Hattori ........................... 726/2

FOREIGN PATENT DOCUMENTS

| FR | 2 820 847 | 8/2002 |
| JP | 9-204484 | 8/1997 |
| JP | 10-340231 | 12/1998 |
| JP | 11-120264 | 4/1999 |
| JP | 2005/352908 | * 12/2005 |
| JP | 2005352908 A | * 12/2005 |
| KR | 10-2005-0026574 | 3/2005 |
| WO | WO 2004/034202 | 4/2004 |

OTHER PUBLICATIONS

G. Schellhorn et al., "Verification of a formal security model for multiapplicative smart cards", Proceedings of the European Symposium on Research in Computer Security (ESORICS), Springer Verlag, Berlin, Germany, Oct. 4, 2000, pp. 17-36.

(Continued)

Primary Examiner—Steven S Paik
Assistant Examiner—Sonji Johnson
(74) Attorney, Agent, or Firm—Staas & Halsey LLP (57) ABSTRACT

By concealing the existence of an area using a function (which is referred to as IC privacy function) capable of concealing the data area corresponding to each service (behaving as if the data area does not exist), an existing function provided in the contactless IC card, an access to the data necessary for a service can be inhibited, so as to control to inhibit (lock) use of the contactless IC card on a service-by-service basis.

13 Claims, 9 Drawing Sheets

OTHER PUBLICATIONS

First Page of Office Action mailed on Apr. 17, 2008 and issued in corresponding Korean Patent Application No. 10-2006-0114659.

European Search Report, mailed Apr. 24, 2007 and issued in corresponding European Patent Application No. 06255532.1-2212.

* cited by examiner

IC card lock mode setting

☐ Overall lock

☐ Lock on a service-by-service basis

[Select]

FIG. 3B

IC card lock mode setting

■ Overall lock

☐ Lock on a service-by-service basis

Setting the overall lock is completed.

[Select]

FIG. 3C

Setting the service-by-service lock

■ Edy

☐ Suica

[Select all] [Register] [Cancel]

FIG. 3D

Setting the service-by-service lock

■ Edy

☐ Suica

Setting the service-by-service lock is completed.

[Select all] [Register] [Cancel]

PORTABLE TERMINAL UNIT

CROSS-REFERENCE TO RELATED APPLICATIONS

This application is based upon and claims the benefit of priority from the prior Japanese Patent Application No. 2006-148103, filed on May 29, 2006, the entire contents of which are incorporated herein by reference.

BACKGROUND OF THE INVENTION

1. Field of the Invention

The present invention relates to a portable terminal unit having a built-in contactless IC card which deals with a plurality of services, and more particularly a portable terminal unit capable of restricting use of a contactless IC card on a service-by-service basis, using the function capable of concealing the existence of a data area in the contactless IC card on a basis of each service which uses the contactless IC card.

2. Description of the Related Art

A contactless IC card includes an antenna therein, and transmits and receives data using a weak radio wave transmitted from an external terminal. The contactless IC card is appropriate to operation in such an environment as having a lot of vibration and dusts, because of being capable of processing without contacting to a read terminal, as opposed to a contact IC card. Further, because a troublesome work of inserting and detaching the card is not needed, the contactless IC card is adopted worldwide as a prepaid card for a railway, bus, or the like, which requires high-speed processing. Moreover, there are increased cases of use of the contactless IC card being adopted for electronic money, a staff identity card, etc.

Furthermore, in recent years, there has appeared a portable telephone terminal with a mounted contactless IC card, having a railway fare payment function (ticket examination function) and an electronic money function for shopping.

As described above, the contactless IC card can provide a plurality of services (such as the railway fare payment function and the electronic money function, which may be referred to as multiple applications) by a single contactless IC card, and data for each service can be managed in the single card. An individual access right can be set to each data, so as to enable each service to be operated independently.

In the official gazette of the Japanese Unexamined Patent Publication No. Hei-11-120264 (hereafter referred to as Patent document 1), an IC card having respective storage areas for respective uses of electronic money is disclosed. In the official gazette of the Japanese Unexamined Patent Publication No. Hei-9-204484 (hereafter referred to as Patent document 2), in an IC card separately managing electronic money information and purchase point information, there is disclosed a technique for authenticating use of the above information by means of a personal identification number. Also, in the official gazette of the Japanese Unexamined Patent Publication No. Hei-10-340231 (hereafter referred to as Patent document 3), in an IC card capable of handling a plurality of services (functions), there is disclosed a technique for managing data for each service by means of authentication processing of a password, etc.

It is expected that use of portable telephone terminals including mounted contactless IC cards will become more and more popular. Consequently, security measures for the portable telephone terminals in the event of being left behind or stolen will become more important.

In the conventional security measures, when a user inhibits (locks) use of the contactless IC card mounted on the portable telephone terminal, it has been configured to make the contactless IC card unusable by shutting off the external power supply (provided inside the portable telephone terminal) to the contactless IC card. In this case, since the power supply to the contactless IC card is shut off, the entire services (functions) to be provided by the contactless IC card become unusable (an overall lock state).

Figure 1:
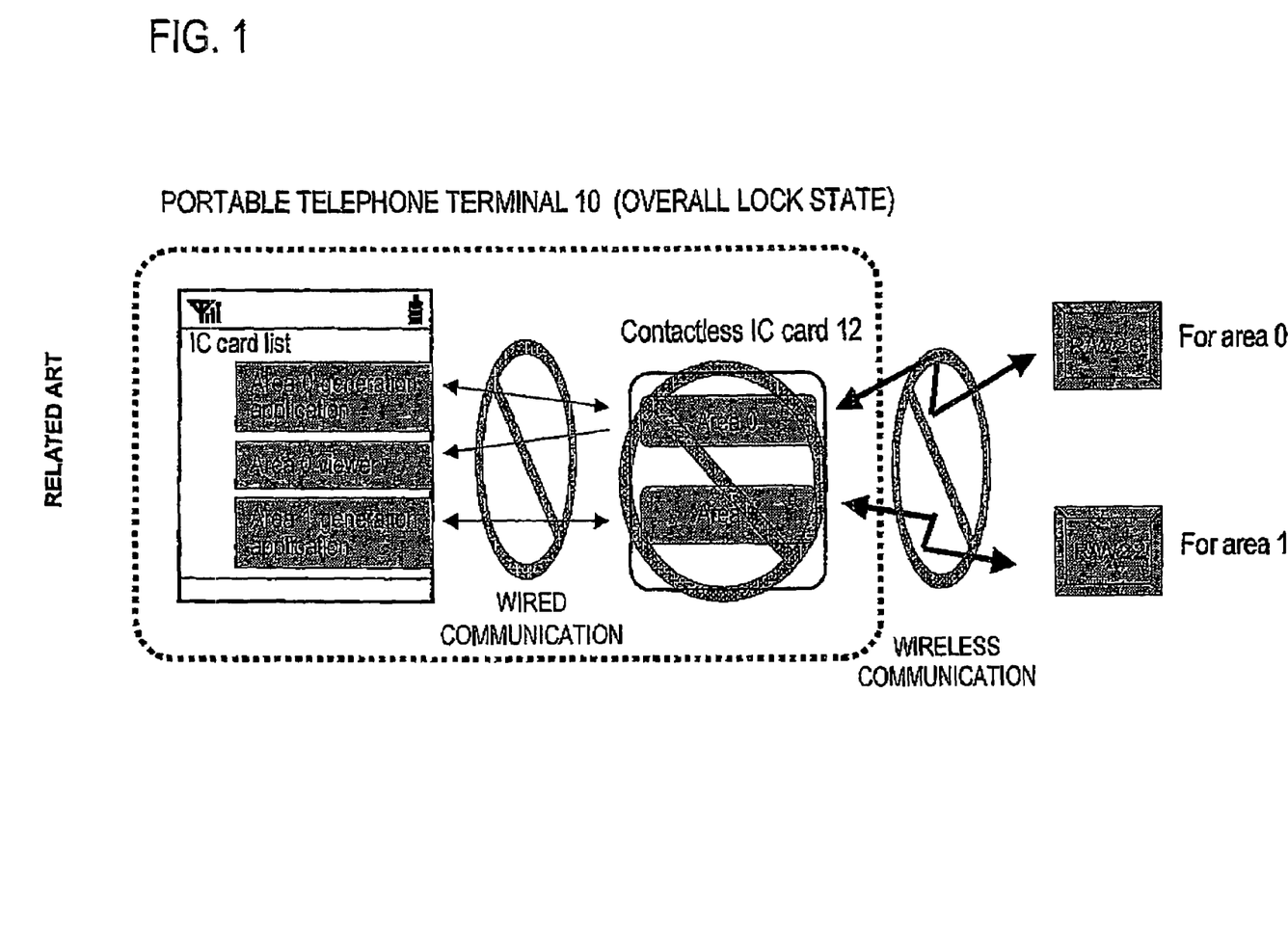
FIG. 1 shows a diagram illustrating a lock operation in the conventional contactless IC card.

FIG. 1 shows a diagram illustrating a lock operation in the conventional contactless IC card. A contactless IC card 12 mounted on a portable telephone terminal 10 communicates with portable telephone terminal 10 by wired communication. Portable telephone terminal 10 executes an application "Area 0 generation application" which generates, and refers to, an area 0 in contactless IC card 12, an application "Area 0 viewer" which refers to the area 0, and an application "Area 1 generation application" which generates, and refers to, an area 1. Here, the area 0 and the area 1 are areas for respectively storing data corresponding to different services. The "Area 0 generation application" is an application executing a service using the data stored in the area 0, while the "Area 1 generation application" is an application executing another service using the data stored in the area 1.

An area-0 reader/writer 20 reads and writes data from/to the area 0 in the contactless IC card, and an area-1 reader/writer 22 reads and writes data from/to the area 1 in the contactless IC card. When the contactless IC card is set to a use inhibition (locked) state, the entire services (applications) become unusable because the entire functions in the contactless IC card are suspended due to the shutoff of the power supply, as shown in the figure (the overall lock state).

In order to ensure the security, it is provable that the user ordinarily carries the portable telephone terminal by setting the contactless IC card to the use inhibition state. Here, in the configuration at present, when the contactless IC card is set to the use inhibition state, the entire services become unusable. This produces some inconvenience in usability because even a service not requiring inhibition of use has to be unlocked by means of a lock release operation prior to the use of the relevant service, and has to be locked again by means of a lock operation after the use.

In the aforementioned Patterned document 1, there is a disclosure in regard to inhibition of use (locking) on a basis of each storage area provided for each use. However, in order to afford the lock function, it is necessary to modify the IC card internally. Also, according to the above Patent documents 2 and 3, authentication processing is performed for each service use by the use of a personal identification number (or a password), and the relevant service becomes usable if the authentication is successful, which is not a state of inhibited use of a service. Therefore, the above method is relatively weak as a security measure.

SUMMARY OF THE INVENTION

Accordingly, it is an object of the present invention to provide a portable terminal unit having a contactless IC card corresponding to a plurality of services, capable of controlling the use inhibition of a contactless IC card on a basis of each service.

In a first configuration of the portable telephone terminal according to the present invention to achieve the above-mentioned object, in a portable terminal unit having a mounted IC card including a first data area generated by a first application, a second data area generated by a second application, and a privacy function capable of concealing the existence of each data area on a basis of the data area, the portable terminal unit includes: a setting means including an individual lock mode for inhibiting the use of only the first application by instructing the IC card to set the privacy function to the first data area corresponding to the first application, on detection of operation for inhibiting the use of the first application; and a control means for inhibiting an access to the first data area in response to an access request from the first application to the first data area, and for transferring the access request to the IC card in response to an access request from the second application to the second data area, thereby executing control to enable the access to the second data area, in case that the privacy function is set to the first data area, while the privacy function is not set to the second data area.

In a second configuration of the portable telephone terminal according to the present invention, in the above first configuration, the control means transfers the access request to the IC card and receives from the IC card a response indicating that the first data area does not exist, in response to an access request to the first data area from a third application which refers to the first data area.

In a third configuration of the portable telephone terminal according to the present invention, in the above first configuration, the setting means includes an overall lock mode which inhibits the entire applications using the IC card by shutting off power supply to the IC card on detecting operation for inhibiting entire accesses to the IC card, and further, the individual lockmode or the overall lock mode is selectable.

In a fourth configuration of the portable telephone terminal according to the present invention, in the above third configuration, the control means decides whether one of the overall lock mode and the individual lock mode is set in regard to an access request from the first application to the first data area, and on deciding that the individual lock mode is set and that the first application is set at the individual lock mode, the control means inhibits the access to the first data area. Also, the control means decides whether one of the overall lock mode and the individual lock mode is set in regard to an access request from the second application to the second data area, and on deciding that the individual lock mode is set, and that the second application is not set at the individual lock mode, the control program transfers the access request to the IC card, so as to enable the access to the second data area.

In a fifth configuration of the portable telephone terminal according to the present invention, in the above third configuration, the control means decides whether one of the overall lock mode and the individual lock mode is set in regard to the access request to the first data area from the third application which refers to the first data area. Also, on deciding that the individual lock mode is set, and that the third application is not set at the individual lock mode, the control means transfers the access request to the IC card, and receives from the IC card a response indicating that the first data area does not exist.

In a sixth configuration of the portable telephone terminal according to the present invention, in the above first configuration, in response to a deletion request of the first application, the control means inquires whether the privacy function is set to the first data area, and on receiving a response indicating that the privacy function is set, the control means suspends the deletion processing of the first application.

In a seventh configuration of the portable telephone terminal according to the present invention, in the above sixth configuration, in response to the deletion request of the first application, the control means inquires of the IC card whether the first data area exists, and in case of receiving the response indicating that the first data area does not exist, the control means further inquires whether the privacy function is set to the first data area.

Further, there is provided a computer program for realizing the portable terminal unit according to the present invention. By executing the computer program according to the present invention in a CPU mounted on the portable terminal unit, the object of the present invention can be achieved.

According to the present invention, it is possible to inhibit services (applications) using the contactless IC card on a service-by-service basis.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings. However, it is to be noted that the embodiments described below are not intended to restrict the technical scope of the present invention.

According to the embodiment of the present invention, using a function capable of concealing the existence of the data area corresponding to each service (that is, capable of behaving as if the corresponding data area does not exist), which is an existing function provided in the contactless IC card, a control program is provided for controlling inhibition of use (locking) of the contactless IC card on a service-by-service basis, and by executing the above control program in the portable terminal unit, the portable terminal unit controls the inhibition of use (locking) of the contactless IC card on a service-by-service (application-by-application) basis.

Figure 2:
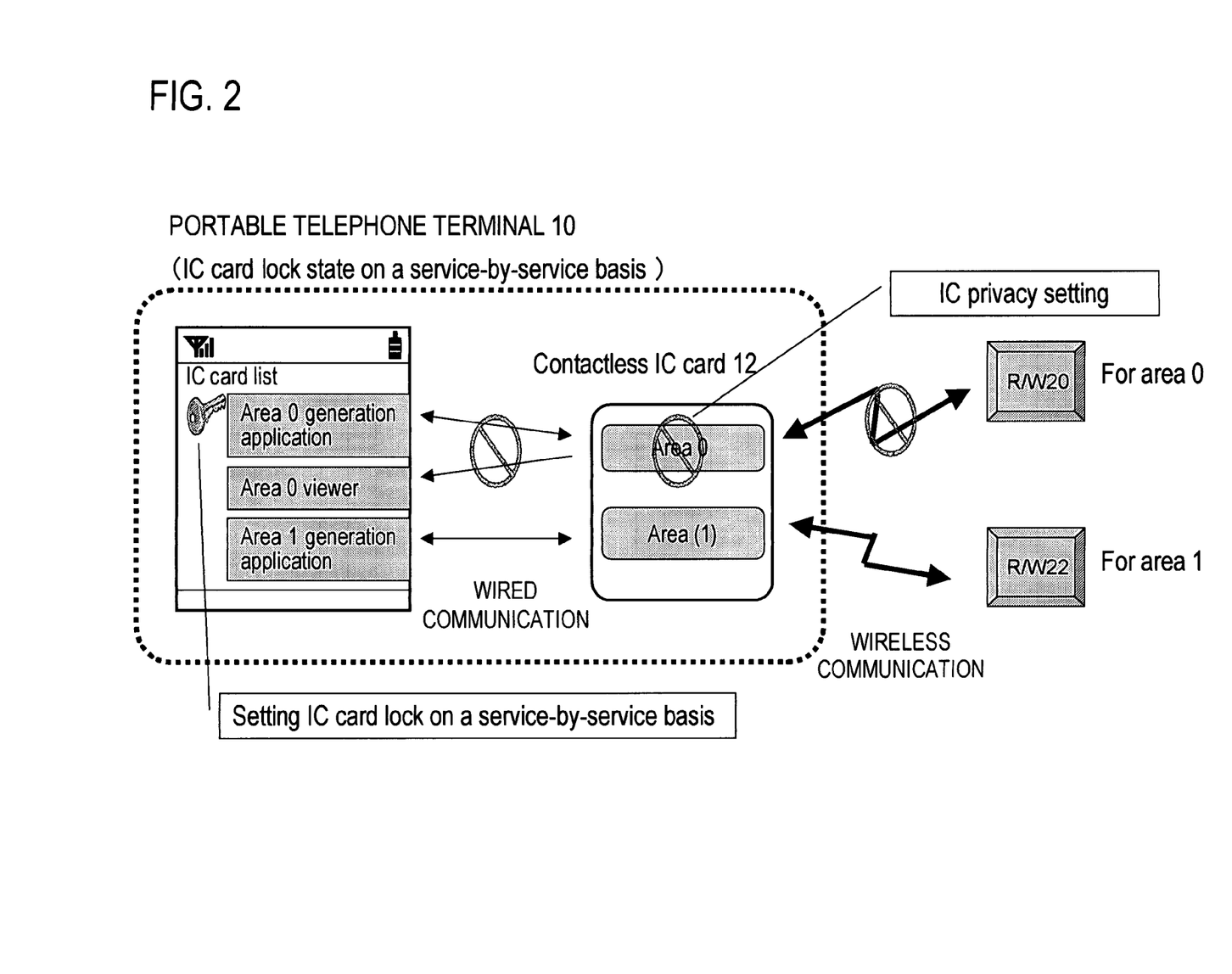
FIG. 2 shows a schematic diagram illustrating an outline of the lock control of a contactless IC card in a portable terminal unit according to an embodiment of the present invention.

FIG. 2 shows a schematic diagram illustrating an outline of the lock control of a contactless IC card in a portable terminal unit according to an embodiment of the present invention. The contactless IC card mounted on a portable telephone terminal communicates with the portable telephone terminal by wired communication. The portable telephone terminal executes an application "Area 0 generation application" which generates and refers to an area 0 in the contactless IC card, an application "Area 0 viewer" which refers to the area 0, and an application "Area 1 generation application" which generates and refers to an area 1. The area 0 and the area 1 are areas for storing data each corresponding to a different service. The "Area 0 generation application" is an application executing a service using the data stored in the area 0, while the "Area 1 generation application" is an application executing another service using the data stored in the area 1. An area-0 reader/writer reads and writes data from/to the area 0 in the contactless IC card, and an area-1 reader/writer reads and writes data from/to the area 1 in the contactless IC card.

According to the embodiment of the present invention, as shown in the figure, by setting an IC privacy function for concealing the existence of the area 0 in the contactless IC card, it becomes unable to access the area 0, and thereby services using the data stored in the area 0 (services provided by the "Area 0 generation application" and the "Area 0 viewer") become unusable. On the other hand, since there is no IC privacy function set in the area 1, it is possible to access the area 1, and accordingly, services using the data stored in the area 1 (services provided by "Area 1 generation application") are usable (lock on a service-by-service basis).

Hereafter, concrete processing and operations for realizing locking control of the contactless IC card shown in FIG. 2 will be described successively.

Figure 3A:
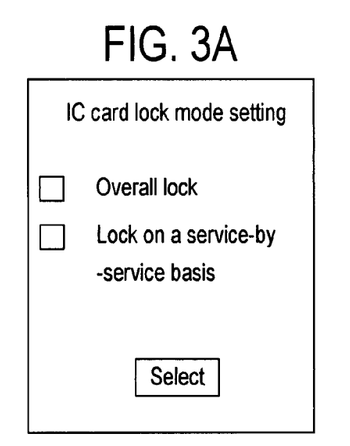
FIGS. 3A-3D show exemplary operational screens for setting the lock range of a contactless IC card.
Figure 3B:
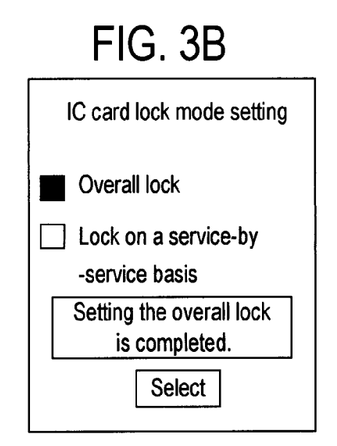

FIG. 3A-3D show exemplary operational screens for setting the lock range of a contactless IC card. As shown in FIG. 3A, there is selected from the menu either one mode out of an "overall lock" mode, in which the use of the entire services is inhibited, and a "lock on a service-by-service basis" mode, in which a service of inhibited use is selectable. When the "overall lock" mode is selected, an indication of the "overall lock" mode setting is displayed, as shown in FIG. 3B. After the "overall lock" mode is set, when an operation requesting locking of the contactless IC card is performed, the power supply to the contactless IC card is shut off, and thereby the entire functions of the contactless IC card is made unusable similar to the conventional manner. Thus, the contactless IC card is shifted to an "overall lock" state.

Figure 3C:
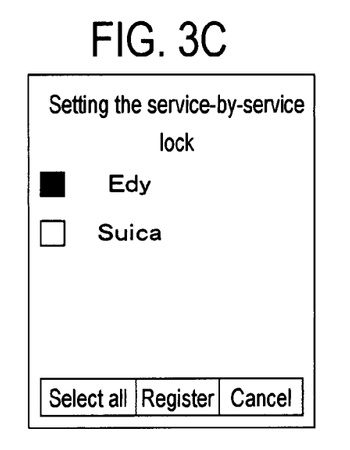
Figure 3D:
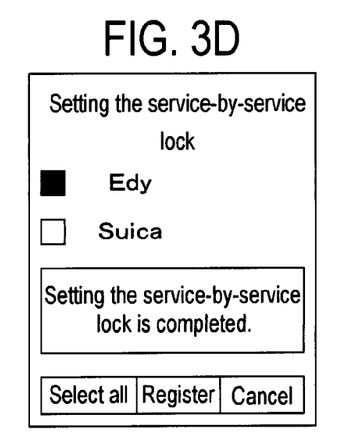

When the "lock on a service-by-service basis" mode is selected, a list of applications (services) of individual lock objects is displayed, as shown in FIG. 3C. Here, only applications having areas generated in the contactless IC card are displayed in the list. When an application to be locked is selected by operating the screen shown in FIG. 3C, an individual lock object mark is set on the selected application, and an indication of the "lock on a service-by-service basis" mode setting is displayed, as shown in FIG. 3D. Thereafter, when an operation requesting locking of the contactless IC card is performed, the contactless IC card performs processing for concealing the existence of the area generated by the above selected application, and thereby the application referring to the area concerned is made unusable. Thus, the contactless IC card is shifted to a "lock on a service-by-service basis" state.

Figure 4:
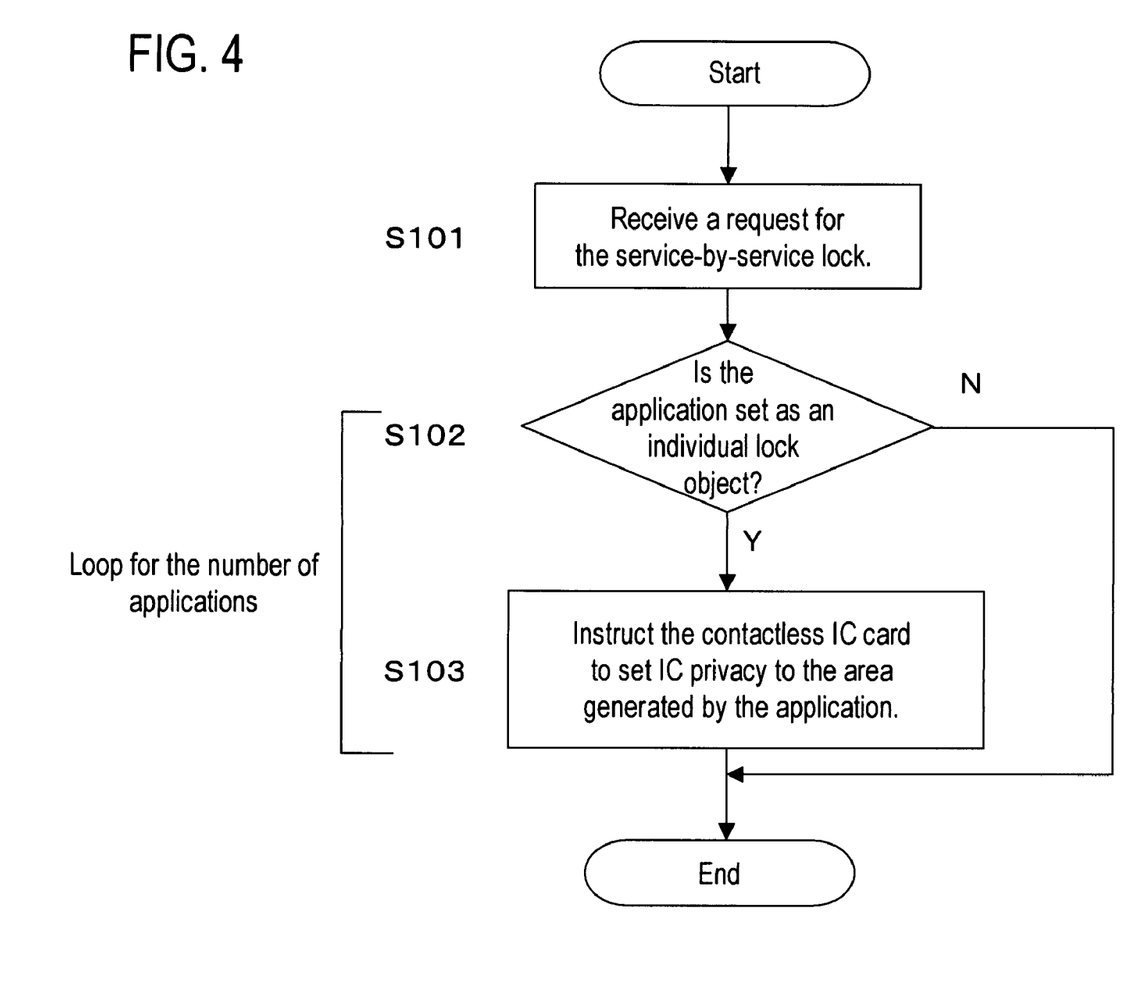
FIG. 4 shows a flowchart of setting processing of the lock on a service-by-service basis.

FIG. 4 shows a flowchart of setting processing of the lock on a service-by-service basis. The processing shown in FIG. 4 is performed when an operation requesting for the "lock on a service-by-service basis" is performed by a user after the "lock on a service-by-service basis" is selected in FIG. 3C. A control program for executing the above processing is stored into a memory such as ROM incorporated in the portable terminal unit. A CPU provided in the portable terminal unit executes the control program.

On detection of a request operation for the "lock on a service-by-service basis" (S101), the control program decides whether an individual lock object is set for each application (S102). The control program then transmits an instruction to the contactless IC card so as to set an IC privacy setting to the area in the contactless IC card which has been generated by the application of the individual lock object (S103). Based on the above instruction, the contactless IC card executes IC privacy setting for concealing the existence of the specified area.

Figure 5:
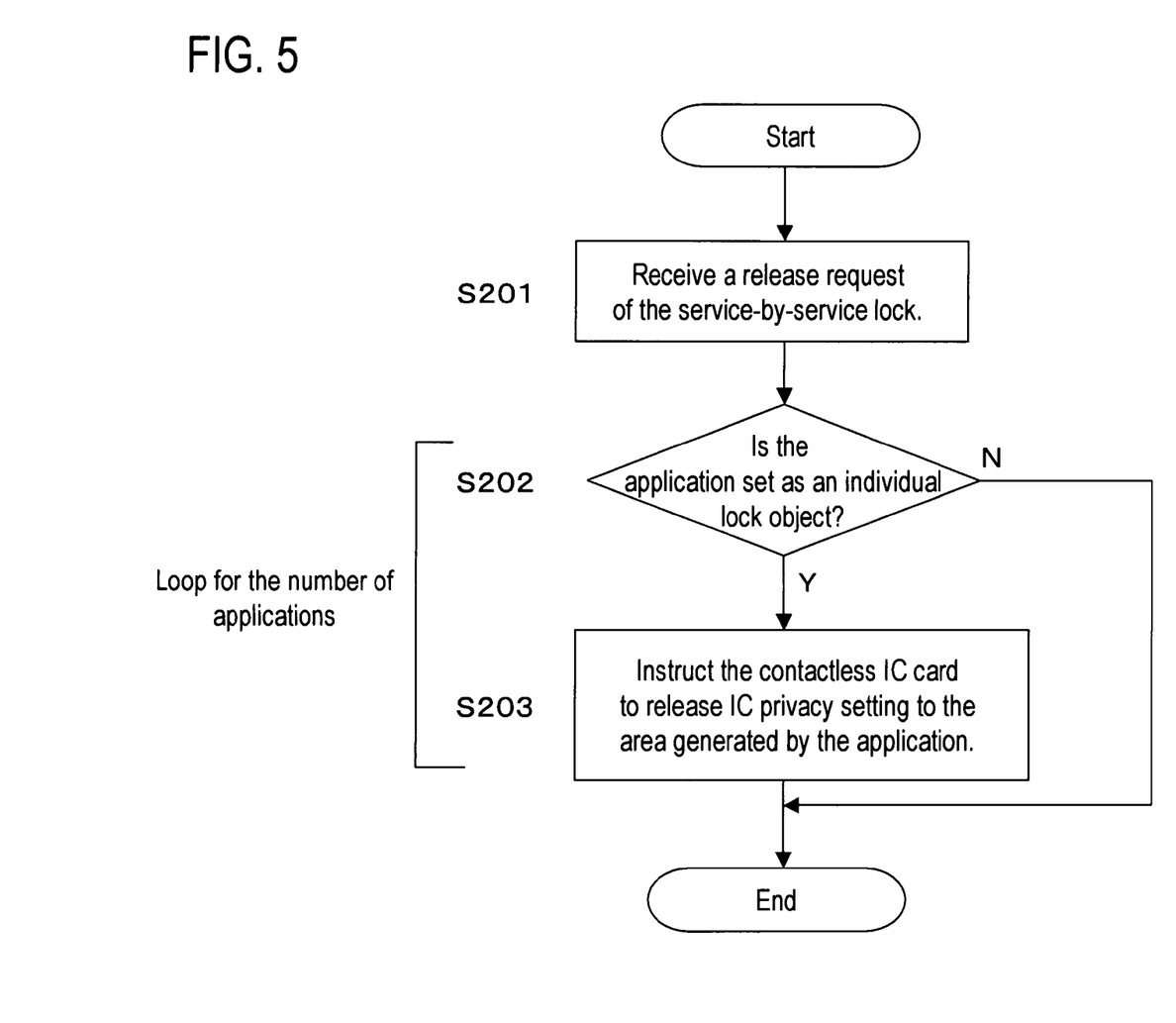
FIG. 5 shows a flowchart of release processing of the lock on a service-by-service basis.

FIG. 5 shows a flowchart of release processing of the lock on a service-by-service basis. The processing shown in FIG. 5 is performed when an operation requesting for releasing the "lock on a service-by-service basis" is performed by the user, after the IC privacy setting is made effective for the specified area by means of the locking processing on a service-by-service basis shown in FIG. 4. A control program for executing the above processing is stored into the memory such as ROM incorporated in the portable terminal unit. The CPU provided in the portable terminal unit executes the control program.

On detection of a request operation for releasing the "lock on a service-by-service basis" (S201), the control program decides whether an individual lock object is set for each application (S202). The control program then transmits an instruction to the contactless IC card so as to release the IC privacy setting for the area in the contactless IC card generated by the application of the individual lock object (S203). Based on the above instruction, the contactless IC card executes release of the IC privacy setting having concealed the existence of the specified area.

Figure 6:
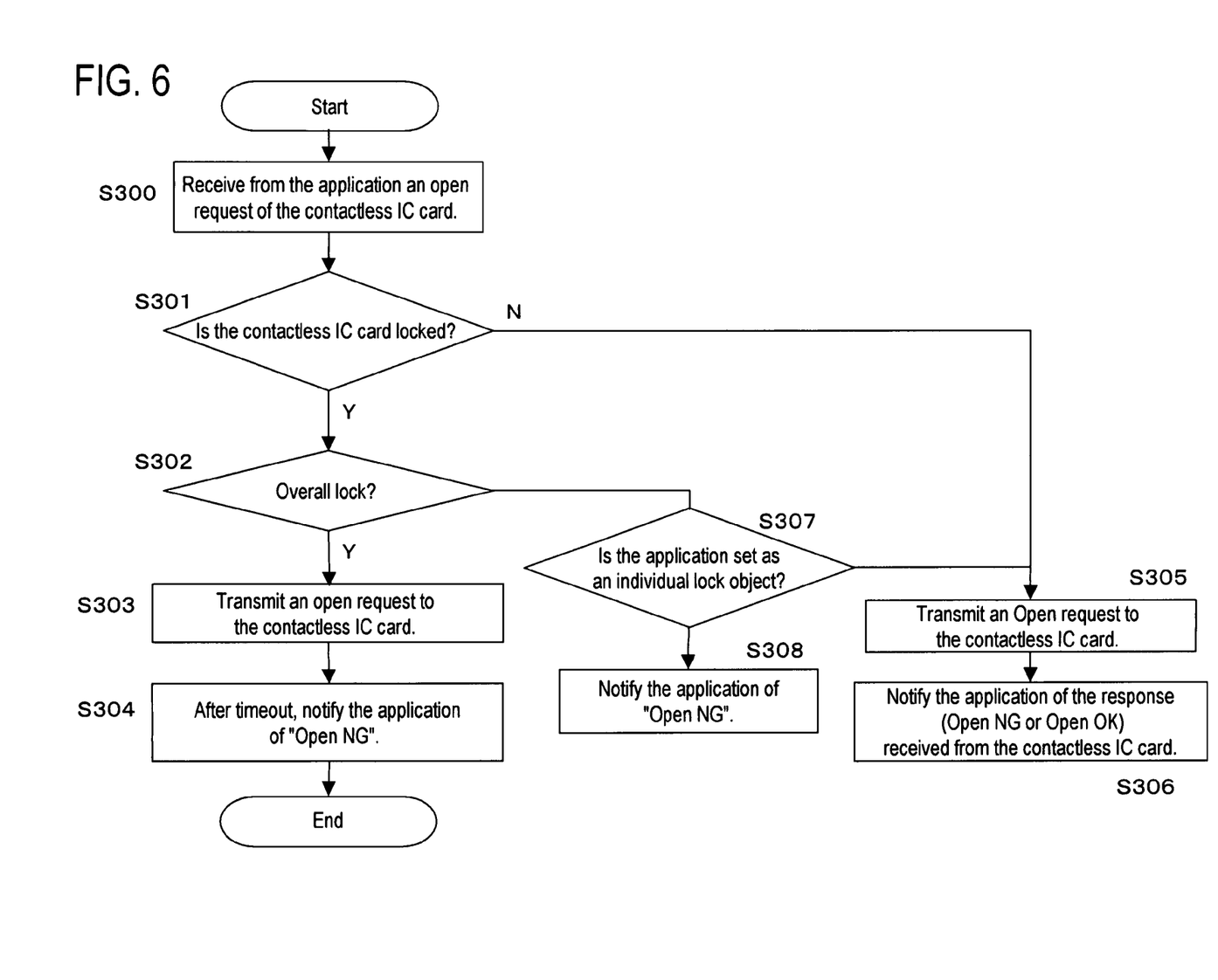
FIG. 6 shows a flowchart of access processing to a contactless IC card in the lock on a service-by-service basis.

FIG. 6 shows a flowchart of access processing to a contactless IC card in the lock on a service-by-service basis. The processing shown in FIG. 6 is performed when an operation for a predetermined application is performed by the user, and when an access request (or referred to as an open request) is made from the application concerned to the contactless IC card. The open request is a request for either reading data necessary for the application from the area in the contactless IC card, or writing data into the area. A control program for executing the above processing is stored in the memory, such as ROM, incorporated in the portable terminal unit. The CPU provided in the portable terminal unit executes the control program.

On receiving the open request from the application (S300), the control program decides whether locking by the "overall lock" or the "lock on a service-by-service basis" is made effective (S301). In case that the locking is made effective and that the locking concerned is the "overall lock" (Y in S302), the control program transmits an open request to the contactless IC card (S303). However, in case of the overall lock, the power supply to the contactless IC card is shutoff, as having been stated in the description of the related art, and accordingly, the contactless IC card does not operate. Therefore, the control program does not receive any response to the open request (for example, a readout data corresponding to a readout request). After a predetermined time lapses before receiving the response to the open request (timeout), the control program issues to the application a notification of "Open NG", a response (return value) indicating that no processing has been performed to the open request (S304). The above processing in case of the "overall lock" is similar to the conventional processing stated in the description of the related art.

In step S301, even in case that neither the "overall lock" nor the "lock on a service-by-service basis" is made effective, the control program also transmits the open request to the contactless IC card (S305). In this case, since the contactless IC card is to be in normal operation, on receipt of the open request from the control program, the contactless IC card performs processing corresponding to the above request, and returns the processing result (such as readout data) to the control program. Based on the above processing result, the control program issues to the application an "Open OK"

notification, a response (return value) indicating that the open request has been processed normally (S306). Needless to say, even in case of anon-locked state, if the control program cannot receive a normal processing result from the contactless IC card due to some cause, the control program issues an "Open NG" notification to the application.

In step S301, in case that locking is made effective and the locking concerned is the "lock on a service-by-service basis", (N in S302), it is decided whether the application having transmitted the open request is an application which is set as individual lock object (S307). If the application is the one being set as individual lock object, the control program issues an "Open NG" notification to the application without transmitting the open request to the contactless IC card (S308).

Assuming that an open request is transmitted to the contactless IC card, the contactless IC card transmits to the control program a response to the effect that an area corresponding to the application having transmitted the open request does not exist, because the IC privacy setting to conceal the existence of an area corresponding to the application of individual lock object has been made in the contactless IC card. The control program notifies the application of the above response, which causes inconvenience such that the application starts processing for generating an area again (which is because the application of the individual lock object is an application for generating the area). For the above reason, when the open request is issued from the application of the individual lock object, the control program in the portable terminal unit issues an "Open NG" notification to the application, instead of transferring the open request to the contactless IC card.

In step S307, when the application of interest is not set as the individual lock object, the control program transmits an open request to the contactless IC card, as in an ordinary case (S305). At this time, the IC privacy setting so as to conceal the existence of an area corresponding to the application of individual lock object has been made in the contactless IC card. Therefore, when the application intends to read/write data from/to the area in which the IC privacy setting has been set, a response indicating that no area exists for the application having sent the open request is transmitted to the control program, although the contactless IC card is in normal operation. The control program issues the above response notification to the application (S306). In this case, because the application of interest is not set as the individual lock object, the application completes the processing without generating an area, even when the application receives the response indicating that no area exists.

Figure 7:
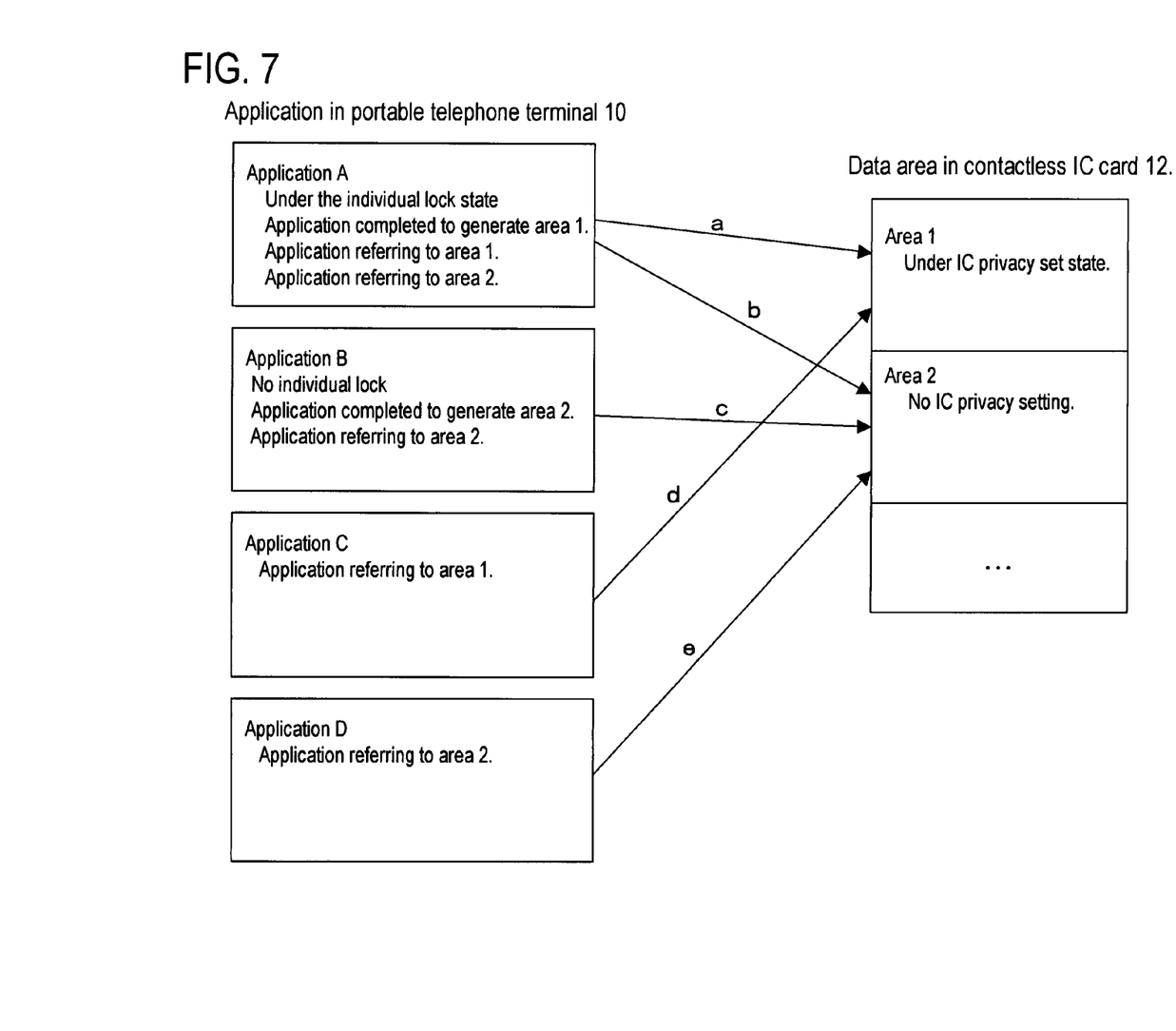
FIG. 7 shows a diagram illustrating application operation in the lock on a service-by-service basis.

FIG. 7 shows a diagram illustrating application operation in the lock on a service-by-service basis. In the example shown in FIG. 7, the portable terminal unit has four applications A, B, C and D. Also, an area 1 generated by the application A and an area 2 generated by the application B exist in the contactless IC card.

The application A is an individual lock object, which is currently locked by the "lock on a service-by-service basis". The application A generates and refers to the area 1, and also refers to the area 2. The application B is not set as the individual lock object, which is not locked individually. The application B generates and refers to the area 2. Further, the application C is an application which refers to the area 1, while the application D is an application which refers to the area 2. Additionally, the applications C and D are not applications for generating areas. Therefore, these applications C and D are not the applications for individual lock object from the first.

An access from the application A to the area 1 (the arrow 'a') corresponds to the processing from S307 to S308 shown in the above FIG. 6. Because the application A is set as the individual lock object, which is currently locked on a service-by-service basis, the access is rejected by the control program (a state that the open request is not transferred to the contactless IC card).

Similarly, an access from the application A to the area 2 (the arrow 'b') is rejected by the control program. Here, because the application A is not an application which generates the area 2, it may also be possible to design so as to permit an access to the area 2.

An access from the application B to the area 2 (the arrow 'c') corresponds to the processing from S307 through S305 to S306 in the above FIG. 6. The application B is not selected as the individual lock object, and an IC privacy setting is not made effective for the area 2 which is generated by the application B. Therefore, the access can be made normally.

An access from the application C to the area 1 (the arrow 'd') corresponds to the processing from S307 through S305 to S306 in the above FIG. 6. Although the application B is not an individual lock object from the first, an IC privacy setting is put into effect for the area 1, and accordingly the contactless IC card behaves as if the area 1 does not exist. As a result, the application 1 cannot access the area 1.

An access from the application D to the area 2 (the arrow 'e') corresponds to the processing from S307 through S305 to S306 in the above FIG. 6. Because the application D is not an individual lock object from the first, and an IC privacy setting is not made effective for the area 2 which the application D intends to access, the relevant access can be made normally.

Practically, an access from an application in the portable terminal unit to an area in the contactless IC card is controlled by the intermediary of the control program, as shown in FIG. 6.

Although not shown in the figure, an external reader/writer which performs wireless communication with the contactless IC card also accesses the area in the contactless IC card by means of wireless communication. The reader/writer directly accesses the area by wireless communication with the contactless IC card. However, since the IC privacy setting is made effective for the area 1, the reader/writer cannot recognize the existence of the area 1. As a result, the reader/writer cannot access the area 1. On the other hand, since the IC privacy setting is not made effective for the area 2, the reader/writer can access the area 2 normally.

Figure 8:
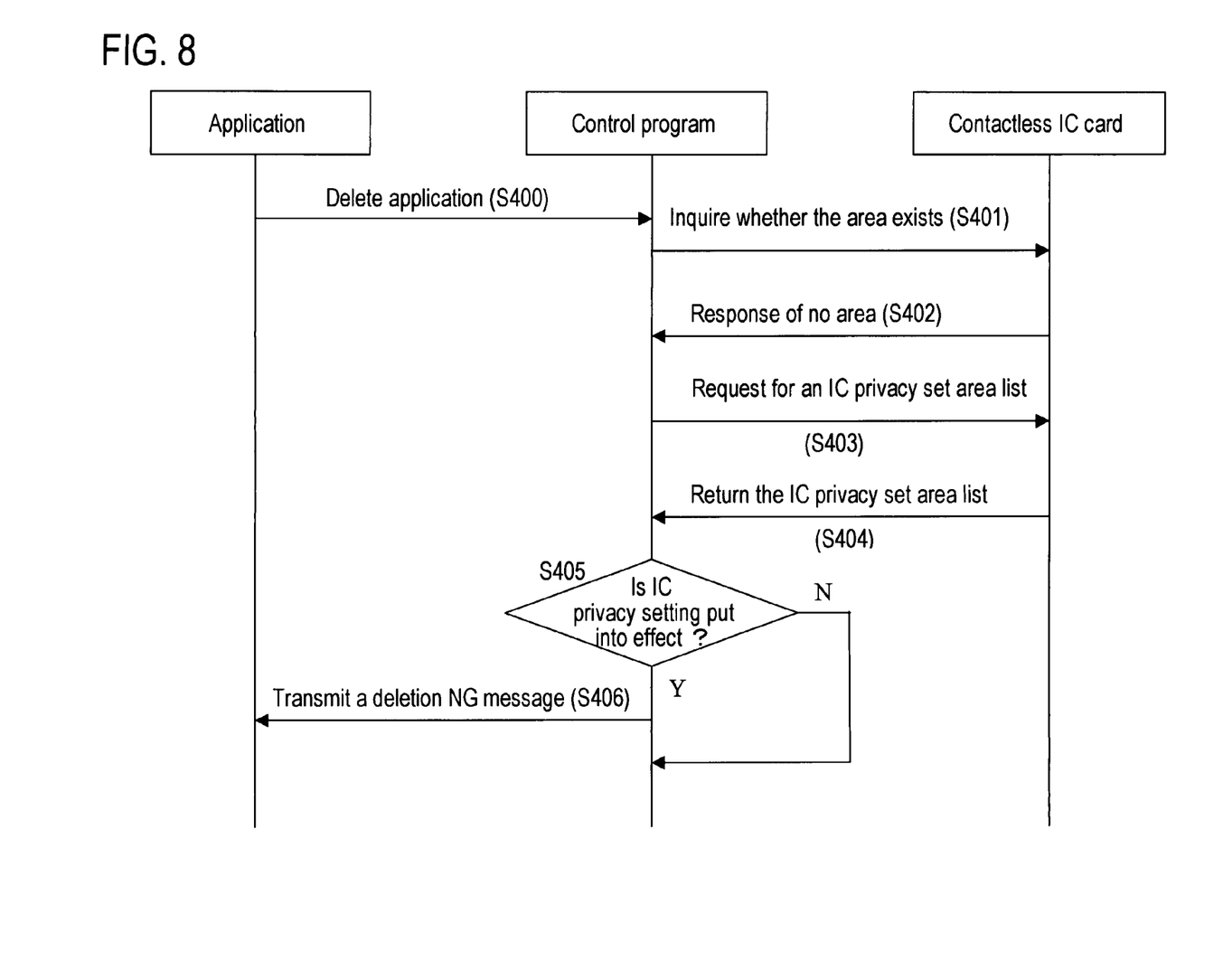
FIG. 8 shows a sequence for application deletion operation during lock on a service-by-service basis.

FIG. 8 shows a sequence for application deletion operation during the lock on a service-by-service basis. When deleting an application that uses the contactless IC card from the portable terminal unit by the will and operation of the user, and when the application of interest has generated an area in the contactless IC card, it is not possible to delete the application before the deletion of the area concerned. However, in the lock on a service-by-service basis according to the present embodiment, the application to be deleted is an object for the lock on a service-by-service basis, and the contactless IC card behaves as if the area does not exist when an IC privacy setting is made effective for the corresponding area. Due to the above behavior, the application is mistakenly deleted earlier than the area even though the area actually exists.

In order to avoid such a trouble as described above, the application deletion processing is operated in the following manner. When the control program receives an application deletion request from the application by a screen operation from the user (S400), the control program inquires of the contactless IC card to confirm whether or not the area generated by the application of deletion object exists (S401). Even when a response indicating non-existence of the area is received from the contactless IC card (S402), there is a possibility that the contactless IC card has transmitted the response of non-existence of the area due to the IC privacy setting, although the area actually exists. Therefore, subsequently, the control program transmits an acquisition request for an IC privacy set area list to the contactless IC card (S403). In response to the above request, the contactless IC card returns the IC privacy set area list, which is then received by the control program (S404).

The control program refers to the above received list, and decides whether the IC privacy setting is made effective for the area corresponding to the application of deletion object (S405). When the IC privacy setting is effective, the control program issues a deletion NG (deletion failure) notification message to the application (user side), without deleting the application of interest (S406).

Figure 9:
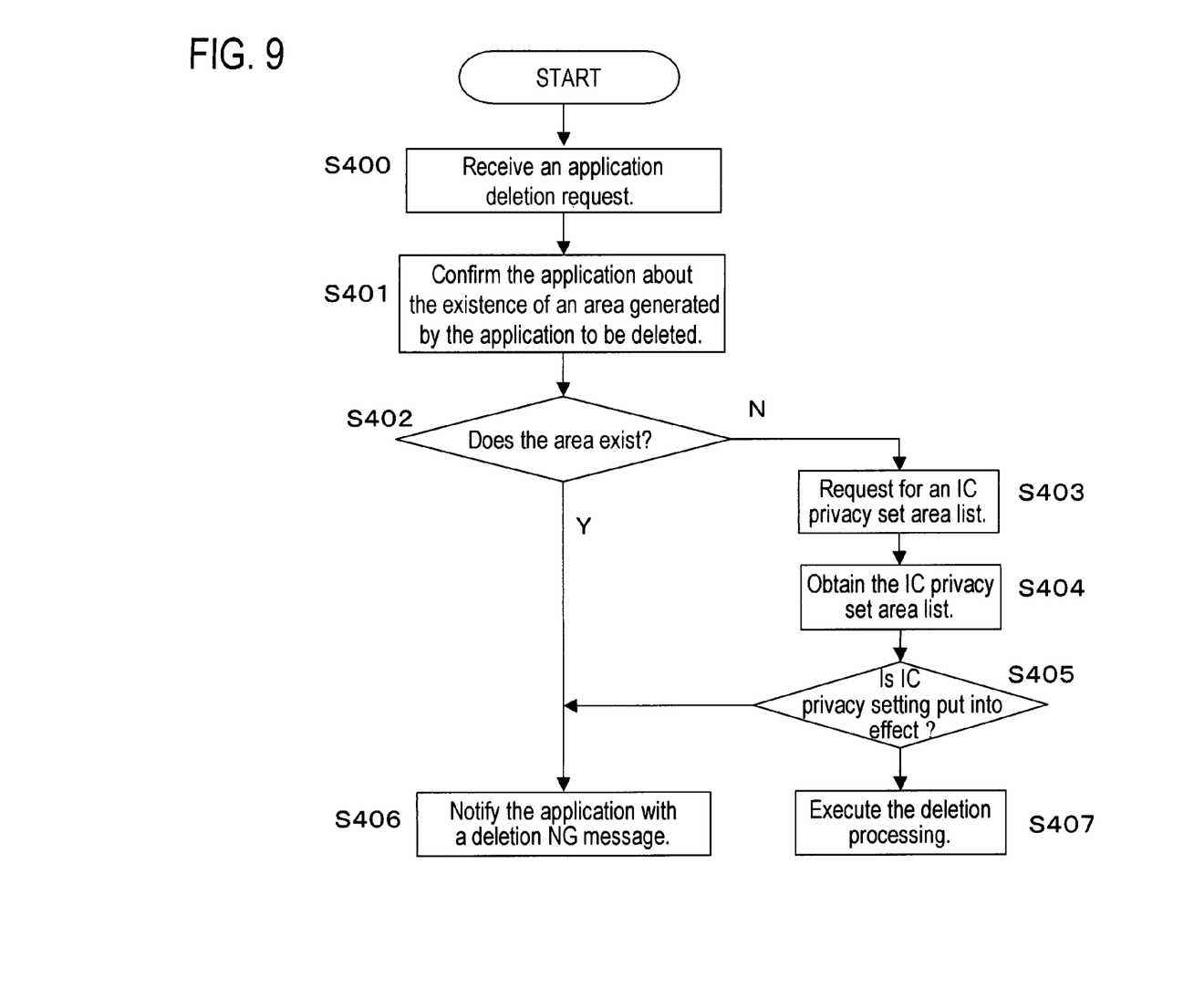
FIG. 9 shows a flowchart of application deletion processing in the control program.

FIG. 9 shows a flowchart of application deletion processing in the control program, in which the processing shown in FIG. 8 is represented as the processing of the control program. When the control program receives an application deletion request from the application (S400) the control program inquires of the contactless IC card and confirms the existence or non-existence of an area generated by the application of deletion object (S401). In case that the area exists (Y in S401), the control program issues a deletion NG notification message to the application (S406). In case that the area does not exist (N in S402), subsequently, the control program transmits an acquisition request for an IC privacy set area list to the contactless IC card (S403). Thereafter, on receipt of the IC privacy set area list from the contactless IC card (S404), the control program refers to the list concerned, and decides whether the IC privacy setting is made effective for the area corresponding to the application of deletion object (S405). In case the IC privacy setting is effective, the control program issues a deletion failure notification message to the application (user side) without deleting the application (S406). In case the IC privacy setting is not effective, the control program deletes the application (S407).

To summarize, conventionally, there has been provided only an overall lock mode in which use of the services using the contactless IC card are integrally inhibited. This causes inconvenience in use because the services of frequent use are undesirably locked. In contrast, according to the embodiment of the present invention, it is possible to exclude services of frequent use from locking, while locking other services. Thus, it becomes possible to improve both the usability and the security.

Namely, in case of the overall lock, even in regard to the services not requiring locking [for example, railway commutation ticket service (ticket examination function)], it is necessary to perform a lock release operation and a re-locking operation on each occasion of using such the services. In contrast, according to the embodiment of the present invention, such operations are not needed, and it is possible to inhibit to use only the services requiring locking (for example, electronic money, credit function, etc.)

What is claimed is:

1. A portable terminal unit having a mounted IC card including a first data area generated by a first application, a second data area generated by a second application, and a privacy function capable of concealing the existence of each data area individually, the portable terminal unit comprising:
   a setting unit including an individual lock mode to inhibit the use of only the first application, by instructing the IC card to set the privacy function to the first data area corresponding to the first application on detection of an operation inhibiting the use of the first application; and
   a controller inhibiting an access to the first data area in response to an access request from the first application to the first data area without transferring the access request to the IC card, and transferring the access request to the IC card in response to an access request from the second application to the second data area, thereby executing control to enable the access to the second data area, in a case where the privacy function is set to the first data area while the privacy function is not set to the second data area, and transferring an access request to the IC card and receiving, from the IC card, a response indicating that the first data area does not exist in response to the access request to the first data area from a third application which refers to the first data area.

2. The portable terminal unit according to claim 1, wherein, on detecting an operation to inhibit entire accesses to the IC card, the setting unit comprises an overall lock mode which inhibits the entire applications using the IC card by shutting off power supply to the IC card, and
wherein the individual lock mode or the overall lock mode is selectable.

3. The portable terminal unit according to claim 2, wherein, in response to an access request from the first application to the first data area, the controller decides whether one of the overall lock mode and the individual lock mode is set, and on deciding that the individual lock mode is set and that the first application is set at the individual lock mode, the controller inhibits the access to the first data area, and
in response to an access request from the second application to the second data area, the controller decides whether one of the overall lock mode and the individual lock mode is set and, on deciding that the individual lock mode is set and that the second application is not set at the individual lock mode, the control program transfers the access request to the IC card, so as to enable the access to the second data area.

4. The portable terminal unit according to claim 2, wherein, in response to an access request to the first data area from the third application which refers to the first data area, the controller decides whether one of the overall lock mode and the individual lock mode is set, and, on deciding that the individual lock mode is set and that the third application is not set at the individual lock mode, the controller transfers the access request to the IC card, and receives from the IC card a response indicating that the first data area does not exist.

5. The portable terminal unit according to claim 1, wherein, in response to a deletion request of the first application, the controller inquires whether the privacy function is set to the first data area and, on receiving a response indicating that the privacy function is set, the controller suspends the deletion processing of the first application.

6. The portable terminal unit according to claim 5, wherein, in response to the deletion request of the first application, the controller inquires of the IC card whether the first data area exists and, in case of receiving the response indicating that the first data area does not exist, the controller further inquires whether the privacy function is set to the first data area.

7. A computer-readable medium having stored therein a computer program executed in a portable terminal unit having a mounted IC card including a first data area generated by a first application, a second data area generated by a second application, and a privacy function capable of concealing the existence of each data area by the data area, the computer program enabling the portable terminal unit to execute:

setting processing including an individual lock mode to inhibit the use of only the first application, by instructing the IC card to set the privacy function to the first data area corresponding to the first application on detection of operation for inhibiting the use of the first application; and control processing for inhibiting an access to the first data area in response to an access request from the first application to the first data area, and for transferring the access request to the IC card in response to an access request from the second application to the second data area, thereby enabling the access to the second data area, in case that the privacy function is set to the first data area, while the privacy function is not set to the second data area.

8. The computer-readable medium according to claim 7, wherein, in response to an access request to the first data area from a third application which refers to the first data area, the control processing transfers the access request to the IC card and receives from the IC card a response indicating that the first data area does not exist.

9. The computer-readable medium according to claim 7, wherein, on detecting an operation for inhibiting entire accesses to the IC card, the setting processing comprises an overall lock mode which inhibits the entire applications using the IC card by shutting off power supply to the IC card, and wherein the individual lock mode or the overall lock mode is selectable.

10. The computer-readable medium according to claim 9, wherein:

in response to an access request from the first application to the first data area, the control processing decides whether one of the overall lock mode and the individual lock mode is set and, on deciding that the individual lock mode is set and that the first application is set at the individual lock mode, the control processing inhibits the access to the first data area, and in response to an access request from the second application to the second data area, the control processing decides whether one of the overall lock mode and the individual lock mode is set and, on deciding that the individual lock mode is set and that the second application is not set at the individual lock mode, the control program transfers the access request to the IC card so as to enable the access to the second data area.

11. The computer-readable medium according to claim 9, wherein:

in response to an access request to the first data area from the third application which refers to the first data area, the control processing decides whether one of the overall lock mode and the individual lock mode is set and, on deciding that the individual lock mode is set and that the third application is not set at the individual lock mode, the control processing transfers the access request to the IC card and receives from the IC card a response indicating that the first data area does not exist.

12. The computer-readable medium according to claim 7, wherein, in response to a deletion request of the first application, the control processing inquires whether the privacy function is set to the first data area, and on receiving a response indicating that the privacy function is set, the control processing suspends the deletion processing of the first application.

13. The computer-readable medium according to claim 12, wherein, in response to the deletion request of the first application, the control processing inquires of the IC card whether the first data area exists, and in case of receiving the response indicating that the first data area does not exist, the control processing further inquires whether the privacy function is set to the first data area.

* * * * *

UNITED STATES PATENT AND TRADEMARK OFFICE
CERTIFICATE OF CORRECTION

PATENT NO. : 7,735,734 B2 Page 1 of 1
APPLICATION NO. : 11/589184
DATED : June 15, 2010
INVENTOR(S) : Hiroyuki Nakatsugawa et al.

It is certified that error appears in the above-identified patent and that said Letters Patent is hereby corrected as shown below:

Column 10, Line 66 before "program" delete "computer".

Signed and Sealed this

Sixteenth Day of November, 2010

David J. Kappos
*Director of the United States Patent and Trademark Office*